United States Patent
Haack

(10) Patent No.: US 8,534,605 B2
(45) Date of Patent: Sep. 17, 2013

(54) AIRCRAFT FUSELAGE STRUCTURE AND METHOD FOR PRODUCING IT

(75) Inventor: Cord Haack, Beckdorf (DE)

(73) Assignee: Airbus Operations GmbH, Hamburg (DE)

( * ) Notice: Subject to any disclaimer, the term of this patent is extended or adjusted under 35 U.S.C. 154(b) by 313 days.

(21) Appl. No.: 12/227,669

(22) PCT Filed: Jun. 5, 2007

(86) PCT No.: PCT/EP2007/055519
§ 371 (c)(1),
(2), (4) Date: Mar. 24, 2010

(87) PCT Pub. No.: WO2007/141268
PCT Pub. Date: Dec. 13, 2007

(65) Prior Publication Data
US 2010/0181426 A1    Jul. 22, 2010

(30) Foreign Application Priority Data
Jun. 6, 2006  (DE) .......................... 10 2006 026 169

(51) Int. Cl.
*B64C 1/00* (2006.01)

(52) U.S. Cl.
USPC ...................................... 244/120; 244/117 R

(58) Field of Classification Search
USPC .................... 244/117, 118.2, 118.5, 119, 120
See application file for complete search history.

(56) References Cited

U.S. PATENT DOCUMENTS

| | | | |
|---|---|---|---|
| 1,355,741 A | 10/1920 | Gilmore et al. | |
| 1,393,488 A | 10/1921 | Black | |
| 1,874,610 A | 8/1932 | Payne | |
| 1,885,406 A | 11/1932 | Bechereau | |
| 1,963,416 A | 6/1934 | Minshall | |
| 2,134,260 A | * 10/1938 | Nickerson | 244/119 |
| 2,259,624 A | 10/1941 | Dornier | |
| 2,263,365 A | 11/1941 | Nicolaus et al. | |
| 2,372,905 A | 4/1945 | McKinnie | |

(Continued)

FOREIGN PATENT DOCUMENTS

| | | |
|---|---|---|
| DE | 4019744 | 1/1992 |
| DE | 10145272 | 4/2003 |

(Continued)

OTHER PUBLICATIONS

Notification of Transmittal of The International Search Report and The Written Opinion of the International Searching Authority, or the Declaration for International Application No. PCT/EP2007/055556 (Sep. 3, 2007).

(Continued)

*Primary Examiner* — Benjamin P Lee
(74) *Attorney, Agent, or Firm* — Jenkins, Wilson, Taylor & Hunt, P.A.

(57) ABSTRACT

An aircraft fuselage structure is described with frames running in the circumferential direction, stringers running in the longitudinal direction and a skin which is arranged thereon and outwardly seals the aircraft fuselage in a compression-proof manner. According to the invention, it is provided that the aircraft fuselage structure contains prefabricated integral units (10) which each run in the circumferential direction of a fuselage segment and in which the frame (11) of a fuselage segment and connecting elements (17, 18) for connection to skin elements (20) comprising stringers (22) and skin (21) are formed.

15 Claims, 3 Drawing Sheets

(56) References Cited

U.S. PATENT DOCUMENTS

| | | | |
|---|---|---|---|
| 2,407,480 A | 9/1946 | Dean | |
| 2,500,015 A | 3/1950 | Tweney et al. | |
| 2,778,586 A | 1/1957 | Nyerges et al. | |
| 2,925,050 A | 2/1960 | Candlin, Jr. et al. | |
| 3,023,860 A * | 3/1962 | Ellzey | 244/120 |
| 3,155,348 A | 11/1964 | Ricard | |
| 3,405,893 A | 10/1968 | Rajau | |
| 3,677,502 A | 7/1972 | Tupolev et al. | |
| 3,955,781 A | 5/1976 | Tupolev et al. | |
| 4,310,132 A * | 1/1982 | Frosch et al. | 244/119 |
| 4,479,621 A | 10/1984 | Bergholz | |
| 4,622,517 A | 11/1986 | Arnaud et al. | |
| 4,646,993 A | 3/1987 | Baetke | |
| 5,024,399 A * | 6/1991 | Barquet et al. | 244/119 |
| 5,201,831 A * | 4/1993 | Higgins et al. | 244/119 |
| 5,223,067 A | 6/1993 | Hamamoto et al. | |
| 5,242,523 A * | 9/1993 | Willden et al. | 156/285 |
| 5,251,849 A * | 10/1993 | Torres | 244/117 R |
| 5,429,326 A | 7/1995 | Garesche et al. | |
| 5,496,000 A | 3/1996 | Mueller | |
| 5,542,626 A | 8/1996 | Beuck et al. | |
| 5,577,688 A | 11/1996 | Sloan | |
| 5,586,391 A * | 12/1996 | Micale | 29/897.2 |
| 5,752,673 A * | 5/1998 | Schliwa et al. | 244/118.6 |
| 5,779,193 A | 7/1998 | Sloan | |
| 5,806,797 A * | 9/1998 | Micale | 244/120 |
| 5,897,079 A | 4/1999 | Specht et al. | |
| 5,975,183 A | 11/1999 | Reis et al. | |
| 6,114,050 A | 9/2000 | Westre et al. | |
| 6,182,926 B1 | 2/2001 | Moore | |
| 6,364,250 B1 * | 4/2002 | Brinck et al. | 244/119 |
| 6,415,510 B2 | 7/2002 | Mertens et al. | |
| 6,435,242 B1 | 8/2002 | Reis et al. | |
| 6,510,961 B1 * | 1/2003 | Head et al. | 220/645 |
| 6,511,570 B2 * | 1/2003 | Matsui | 156/245 |
| 6,613,258 B1 * | 9/2003 | Maison et al. | 264/102 |
| 6,772,977 B2 | 8/2004 | Dees et al. | |
| 7,025,305 B2 * | 4/2006 | Folkesson et al. | 244/117 R |
| 7,087,317 B2 | 8/2006 | Ehrstrom et al. | |
| 7,108,227 B2 | 9/2006 | Kunzel et al. | |
| 7,124,982 B2 * | 10/2006 | Brofeldt | 244/119 |
| 7,134,629 B2 * | 11/2006 | Johnson et al. | 244/119 |
| 7,159,822 B2 * | 1/2007 | Grantham et al. | 244/119 |
| 7,410,352 B2 * | 8/2008 | Sarh | 425/317 |
| 7,445,180 B2 | 11/2008 | Plude et al. | |
| 7,459,048 B2 * | 12/2008 | Pham et al. | 156/173 |
| 7,461,816 B2 | 12/2008 | Schwartz et al. | |
| 7,527,222 B2 * | 5/2009 | Biornstad et al. | 244/120 |
| 7,621,482 B2 | 11/2009 | Sankrithi et al. | |
| 7,686,249 B2 * | 3/2010 | Luttig et al. | 52/630 |
| 7,716,835 B2 * | 5/2010 | Johnson et al. | 29/897.2 |
| 7,857,258 B2 | 12/2010 | Normand et al. | |
| 7,866,440 B2 | 1/2011 | Douglas | |
| 7,874,516 B2 | 1/2011 | Cacciaguerra | |
| 2001/0004096 A1 * | 6/2001 | Entelmann et al. | 244/119 |
| 2002/0153454 A1 | 10/2002 | Seidel | |
| 2004/0195452 A1 * | 10/2004 | Brofeldt | 244/119 |
| 2005/0037188 A1 * | 2/2005 | Ehrstrom et al. | 428/299.4 |
| 2005/0236523 A1 * | 10/2005 | Schwartz et al. | 244/119 |
| 2005/0263645 A1 * | 12/2005 | Johnson et al. | 244/119 |
| 2006/0060705 A1 * | 3/2006 | Stulc et al. | 244/119 |
| 2006/0071125 A1 | 4/2006 | Wood et al. | |
| 2006/0108058 A1 * | 5/2006 | Chapman et al. | 156/245 |
| 2006/0192051 A1 | 8/2006 | Novak et al. | |
| 2006/0226287 A1 | 10/2006 | Grantham et al. | |
| 2006/0231682 A1 * | 10/2006 | Sarh | 244/119 |
| 2006/0237587 A1 | 10/2006 | Luttig et al. | |
| 2007/0176048 A1 | 8/2007 | Huber et al. | |
| 2007/0210211 A1 * | 9/2007 | Grob | 244/119 |
| 2008/0093503 A1 | 4/2008 | Cacciaguerra | |
| 2008/0105785 A1 | 5/2008 | Griess et al. | |
| 2008/0149768 A1 * | 6/2008 | Sarh | 244/120 |
| 2008/0156935 A1 | 7/2008 | Alby et al. | |
| 2008/0179460 A1 * | 7/2008 | Rodriguez et al. | 244/119 |
| 2008/0210820 A1 | 9/2008 | Kismarton et al. | |
| 2008/0223985 A1 | 9/2008 | Marsh et al. | |
| 2008/0230652 A1 * | 9/2008 | Biornstad et al. | 244/120 |
| 2008/0237442 A1 * | 10/2008 | Sarh | 249/184 |
| 2008/0246175 A1 * | 10/2008 | Biornstad et al. | 264/109 |
| 2008/0258007 A1 | 10/2008 | Guard et al. | |
| 2009/0020645 A1 * | 1/2009 | Cacciaguerra | 244/119 |
| 2009/0039208 A1 | 2/2009 | Raeckers | |
| 2009/0101756 A1 | 4/2009 | Cacciaguerra | |
| 2009/0139641 A1 * | 6/2009 | Chapman et al. | 156/242 |
| 2009/0217529 A1 * | 9/2009 | Cerezo et al. | 29/897.2 |
| 2009/0250554 A1 * | 10/2009 | Graeber et al. | 244/120 |
| 2009/0294588 A1 * | 12/2009 | Griess et al. | 244/121 |
| 2009/0314891 A1 | 12/2009 | Haack | |
| 2009/0321569 A1 | 12/2009 | Schroeer et al. | |
| 2010/0025531 A1 | 2/2010 | Pahl | |
| 2010/0025532 A1 * | 2/2010 | Herrmann et al. | 244/120 |
| 2010/0044510 A1 | 2/2010 | Schroeer et al. | |
| 2010/0133380 A1 | 6/2010 | Roebroeks et al. | |
| 2010/0133382 A1 * | 6/2010 | Pahl | 244/120 |
| 2010/0155532 A1 * | 6/2010 | Martin et al. | 244/119 |
| 2010/0181426 A1 * | 7/2010 | Haack | 244/119 |
| 2010/0213315 A1 * | 8/2010 | Marpinard | 244/119 |
| 2010/0219294 A1 | 9/2010 | Kismarton | |
| 2010/0308165 A1 * | 12/2010 | Markowski et al. | 244/119 |
| 2010/0327113 A1 * | 12/2010 | Marquez Lopez et al. | 244/119 |
| 2011/0006159 A1 * | 1/2011 | Herrmann et al. | 244/119 |
| 2011/0011978 A1 | 1/2011 | Haack et al. | |
| 2011/0056066 A1 | 3/2011 | Alvez | |
| 2011/0073708 A1 | 3/2011 | Biornstad et al. | |

FOREIGN PATENT DOCUMENTS

| | | |
|---|---|---|
| DE | 10145276 | 7/2003 |
| DE | 10314039 | 10/2004 |
| DE | 102004056286 | 5/2006 |
| DE | 102005023886 | 12/2006 |
| EP | 1149687 | 10/2001 |
| EP | 1731419 | 12/2006 |
| ES | 2112711 | 4/1998 |
| FR | 1345076 | 12/1963 |
| FR | 2766407 | 1/1999 |
| GB | 159 351 | 3/1921 |
| GB | 958883 | 5/1964 |
| GB | 2196922 | 5/1988 |
| JP | 54-031280 | 10/1979 |
| JP | 58-078895 | 5/1983 |
| JP | 59-176669 | 10/1984 |
| JP | 06-298186 | 10/1994 |
| JP | 2001-310798 | 11/2001 |
| JP | 2008-519730 | 6/2008 |
| RU | 2157757 | 10/2000 |
| RU | 2435703 | 7/2010 |
| WO | WO 9610477 | 4/1996 |
| WO | WO 2005012085 | 2/2005 |
| WO | WO 2005084152 | 9/2005 |
| WO | WO 2005/121627 | 12/2005 |
| WO | WO 2006001859 | 1/2006 |
| WO | WO 2006051235 | 5/2006 |
| WO | WO 2007141251 A2 | 12/2007 |
| WO | WO 2007141268 | 12/2007 |
| WO | WO 2007141291 | 12/2007 |

OTHER PUBLICATIONS

German Office Action dated Sep. 25, 2007 corresponding to German Patent Application No. 10 2006 026 169.0-22.

German Office Action dated Sep. 25, 2007 corresponding to German Patent Application No. 10 2006 026 170.4-22.

Notification of Transmittal of The International Search Report and The Written Opinion of the International Searching Authority, or the Declaration for International Application No. PCT/EP2007/055519 (Oct. 22, 2007).

German Office Action dated Oct. 30, 2007 corresponding to German Patent Application No. 10 2006 026 168.2-22.

Notification of Transmittal of The International Search Report and The Written Opinion of the International Searching Authority, or the Declaration for International Application No. PCT/EP2007/055494 (Nov. 13, 2008).

Non-final Office Action for U.S. Appl. No. 12/308,004 dated Sep. 9, 2011.

Non-final Office Action for U.S. Appl. No. 12/308,029 dated Sep. 15, 2011.
Non-final Office Action for U.S. Appl. No. 12/308,029 dated May 16, 2012.
Final Office Action for U.S. Appl. No. 12/308,004 dated Apr. 4, 2012.
Japanese Office Action for Appl. No. 2009-513670 dated Apr. 27, 2012.
Advisory Action for U.S. Appl. No. 12/308,004 dated Jul. 27, 2012.
Russian Grant Decision for App. 2009-145997/05 dated Aug. 20, 2012.
Non-Final Office Action for U.S. Appl. No. 12/308,004 dated Oct. 15, 2012.
Non-Final Office Action for U.S. Appl. No. 12/308,029 dated Nov. 5, 2012.

* cited by examiner a)

b)

a)

b)

a)

b)

c)

AIRCRAFT FUSELAGE STRUCTURE AND METHOD FOR PRODUCING IT

FIELD OF THE INVENTION

The invention relates to an aircraft fuselage structure with frames running in the circumferential direction, stringers running in the longitudinal direction and a skin which is arranged thereon and outwardly seals the aircraft fuselage in a compression-proof manner. Furthermore, the invention relates to an integral unit for an aircraft fuselage structure of this type, and to a method for producing the same.

BACKGROUND OF THE INVENTION

Pressurized fuselages of commercial aircraft are typically assembled nowadays from sections which are each constructed from a plurality of shells in which a skin, stringers and frames are connected to one another. Cross members for the hold, main deck and hatrack are subsequently riveted onto the frames, and supporting rods are fitted between cross member and frame and bolted onto joining fittings which are correspondingly riveted on.

SUMMARY OF THE INVENTION

One of the objects of the invention is to provide an aircraft fuselage structure which is weight-saving and can be constructed from few individual parts.

Accordingly, an aircraft fuselage structure includes frames running in a circumferential direction of the fuselage; stringers running in a longitudinal direction of the fuselage; and a skin which is arranged on the frames and the stringers and outwardly seals the aircraft fuselage in a compression-proof manner; wherein the aircraft fuselage structure contains prefabricated integral units which each run in the circumferential direction of a fuselage segment, wherein each of the integral units includes a frame; connecting elements for connection to skin elements comprising stringers and skin; and a cross beam which forms a single-piece component of each of the integral units.

A corresponding method for producing an aircraft fuselage structure with frames running in the circumferential direction, stringers running in the longitudinal direction and a skin which is arranged thereon and outwardly seals the aircraft fuselage in a compression-proof manner, includes the following steps: producing integral units each in one piece which each contain the frame of a fuselage segment, connecting elements for connection to skin elements comprising stringers and skin and a cross beam; producing skin elements which contain skin and stringers; arranging and adjusting the integral units on an installation apparatus; and mounting and connecting the skin elements to the integral units.

BRIEF DESCRIPTION OF THE DRAWINGS

The present invention is explained in more detail below using preferred exemplary embodiments and with reference to the attached figures of the drawings, in which.

In the figures, the same reference numbers refer to identical or functionally identical components unless otherwise stated.

DETAILED DESCRIPTION OF THE INVENTION

Figure 1:
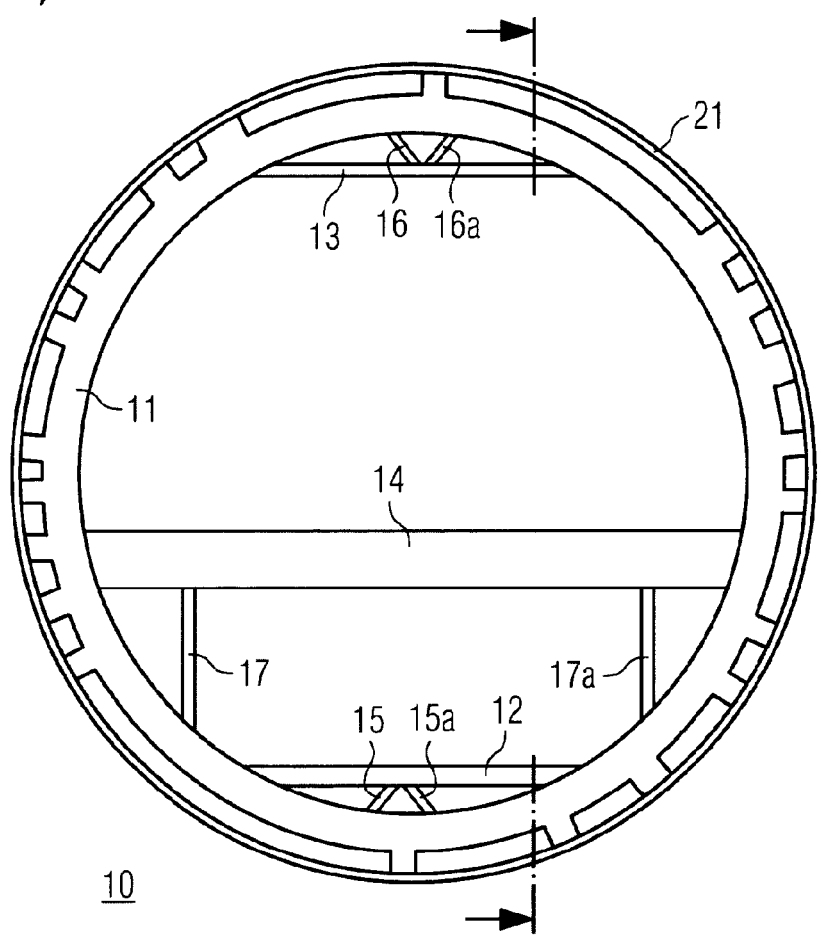
FIG. 1(a) shows a plan view and (b) a side view of an integral unit which is provided for an aircraft fuselage structure according to an exemplary embodiment of the invention.
Figure 1:
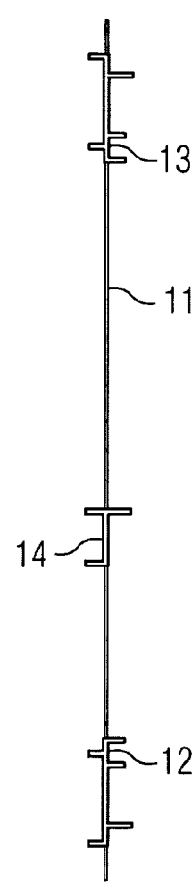

FIG. 1 shows an integral unit 10 which serves for the production of an aircraft fuselage structure which is to contain frames running in the circumferential direction, stringers running in the longitudinal direction and a skin which is arranged thereon and is intended for the compression-proof sealing of the aircraft fuselage to the outside. The integral unit 10 shown in plan view in FIG. 1(a) and in side view in FIG. 1(b) contains a frame 11 of a fuselage segment, i.e. a plane intersecting the aircraft fuselage perpendicularly with respect to its longitudinal direction, and connecting elements 18, 19, which will be illustrated in more detail further on, for connection to skin elements comprising stringers and skin.

In the exemplary embodiment illustrated, the integral units 10 are each prefabricated in one piece and run in an annularly completely closed manner over the entire circumference of a fuselage segment.

Figure 2:
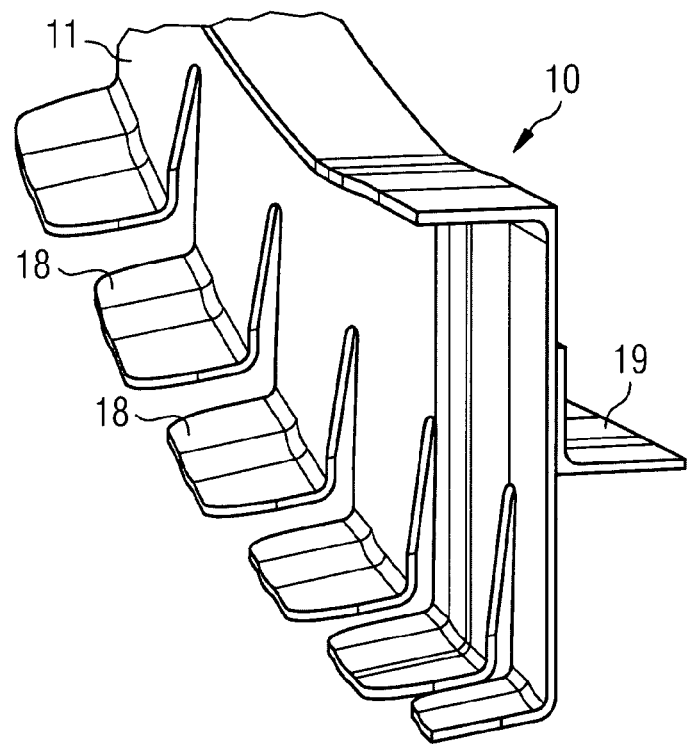
FIGS. 2(a) and (b) show respective connecting elements for connection of an integral unit of the type shown in FIG. 1 to skin elements, comprising stringers and skin, according to one exemplary embodiment of the invention.
Figure 2:
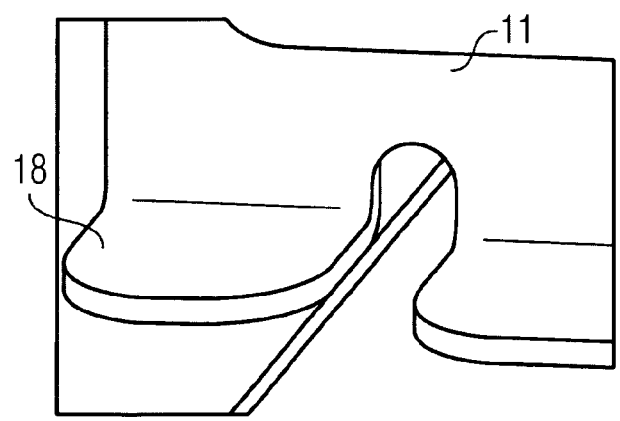

The integral unit 10 comprises a main body which runs in the plane of a fuselage segment and forms the frame 10, and connecting elements 18, 19 which protrude therefrom and are intended for the connection to skin elements comprising stringers 22 and skin 21. These connecting elements 18, 19, which are illustrated in more detail in FIGS. 2(a) and (b), comprise a force-transmission comb 18 which is formed by teeth protruding perpendicularly with respect to the main body of the integral unit 10, which main body forms the frame 11. The skin elements 20 are fixed in a frictional or interlocking manner to said teeth. The fixing can take place by riveting by means of titanium bolts, as also can the closing of longitudinal seams between the skin elements 20.

As FIG. 1 shows, the integral units 10 contain a hold cross member 12, a hatrack stiffening means 13 and a main cross member 14. The hold cross member 12 is supported against the main body of the integral unit 10 by respective supporting elements 15, 15a, the hatrack cross member 13 is supported against the main body of the integral unit 10 by respective supporting elements 16, 16a, and the main deck cross member 14 is supported against the main body of the integral unit 10 by respective supporting elements 17, 17a. In the exemplary embodiment illustrated, the hold cross member 12, the hatrack cross member 13 and the main deck cross member 14 and also the supporting elements 15, 15a, 16, 16a and 17, 17a thereof are designed as integral, single-piece components of the integral unit 10.

The integral units 10 of the exemplary embodiment described are produced from fibre-reinforced plastic, namely from carbon-fibre-reinforced plastic.

The production of the integral units 10 can take place, in particular, in one operation, with all of the necessary components being produced in one piece, i.e. integrally. Production can take place, in particular, in a negative mould in such a manner that tolerances which occur are each apportioned to the side which is unimportant for installation, i.e. on the internal flange of the main body of the integral unit 10, which main body forms the frame, and on the lower side of the cross members 12, 13 and 14.

The integral formation in the integral unit of all of the support and connecting elements occurring in a fuselage segment, together with the weight-saving CFRP construction described reduce the weight and increase the strength, and a large number of joining and connecting points between the respective elements are omitted.

Figure 3:
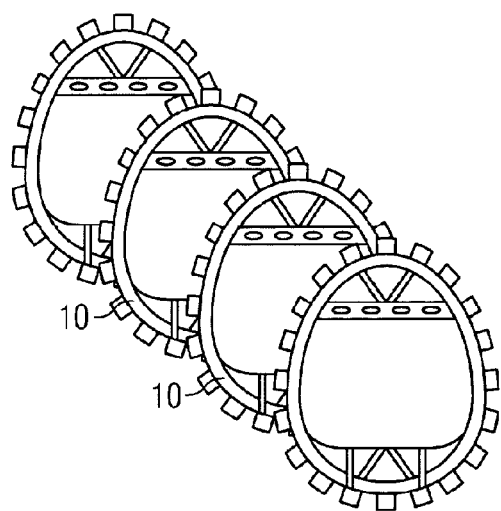
FIGS. 3(a), (b) and (c) show a schematic illustration of a method for producing an aircraft fuselage structure, in which prefabricated integral units and prefabricated skin are joined together to form an aircraft fuselage structure, according to one exemplary embodiment of the invention.
Figure 3:
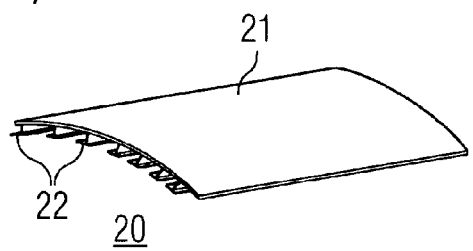
Figure 3:
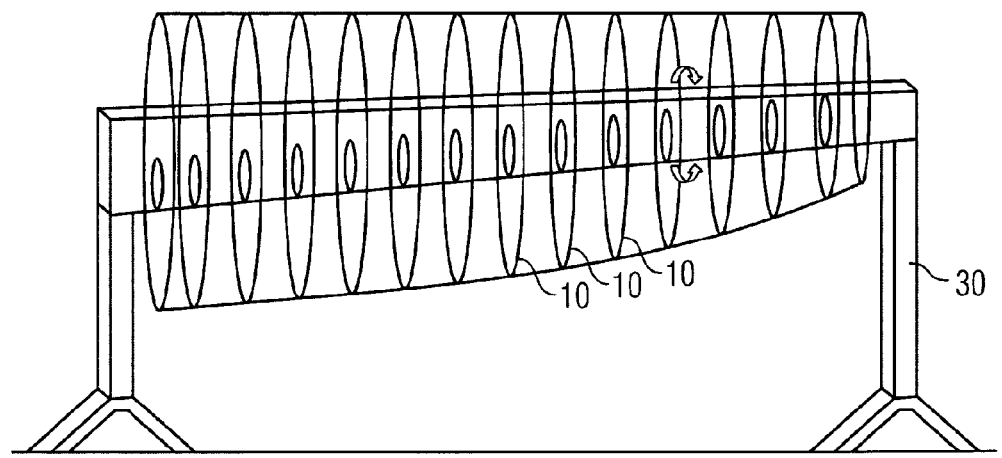

A method for producing an aircraft fuselage structure according to the invention is to be described below with reference to FIG. 3. Said method contains the production of the integral units 10 of the type described above, which are required for the aircraft fuselage structure and contain the frame 11 of a fuselage segment, the connecting elements 18, 19 for connection to skin elements 20 comprising the stringers 22 and the skin 21, and the cross members 12, 13, 14 and the supporting elements 15, 15a, 16, 16a and 17, 17a, and optionally further elements which are not illustrated specifically here. Furthermore, the skin elements 20 which contain the skin 21 and the stringers 22 are produced. Furthermore, the skin elements 20 may already be completed with window frames, door frames and the like. The completed integral units 10 are illustrated in schematic form in FIG. 3(a). The integral units 10 are then arranged on an installation apparatus 30 and adjusted, and the skin elements 20 are mounted on the integral units 10 and are connected thereto, as illustrated in schematic form in FIG. 3(c).

During the production of the skin elements 20, glass-fibre and aluminium composite tabs ("GLARE") can be provided at critical points, in particular at those which are subsequently located in the region of the integral units 10. Composite tabs of this type are formed by a laminate of layers of a thin sheet of an aluminium alloy and a textile fibre material, that is a woven fabric or insert of glass fibres or similar suitable fibres which are alternately layered one above another. Composite tabs of this type serve to compensate for different thermal coefficients of expansion of light metal alloys and fibre-reinforced plastics. Their composite structure enables them to adapt the different coefficients of expansion of the materials involved. Composite tabs of this type can also be provided at the connecting points of skin elements 20 adjacent to the skin 21.

Frame angle brackets 18 which are formed on the integral units 10 are riveted to the skin elements 20. All of the longitudinal members to be provided in the aircraft fuselage structure, such as seat rails and the supports thereof, are then introduced and bolted down.

The skin shells 20, the skin 21 thereof and the stringers 22 thereof can be produced from a fibre-reinforced plastic material (CFRP) or from light metal. If they are not composed of a fibre-reinforced plastic material, the different thermal coefficients of expansion of integral unit 10 and skin element 20 have to be dealt with by the force-transmission comb 18, the riveting and the skin 21 in the circumferential direction. A compensation of different thermal coefficients of expansion can take place by means of the above-described glass-fibre and aluminium composite tabs. Composite tabs of this type can also be used in order to strengthen the skin elements 20 against possible large longitudinal tears if the aircraft fuselage structure is subjected to unusual stresses.

The aircraft fuselage structure produced in the manner described can then also be supplemented by a cockpit unit and a corner section, which supports the tail unit, to provide the complete aircraft fuselage.

LIST OF REFERENCE NUMBERS

10 Integral unit
11 Frame, main body
12 Hold cross member
13 Hatrack cross member
14 Main deck cross member
15, 15a Supporting element
16, 16a Supporting element
17, 17a Supporting element
18 Force-transmission comb
19 Frame bracket
20 Skin element
21 Skin
22 Stringer
30 Installation apparatus

What is claimed is:

1. An aircraft fuselage structure comprising:
   frames running in a circumferential direction of the fuselage;
   stringers running in a longitudinal direction of the fuselage; and
   a skin which is arranged on the frames and the stringers and outwardly seals the aircraft fuselage in a compression-proof manner;
   wherein the aircraft fuselage structure comprises:
      a plurality of prefabricated integral units which each run in the circumferential direction of a fuselage segment, and
      a plurality of skin elements comprising stringers and a skin, and wherein each of the integral units further comprises at least:
      a frame; and
      a plurality of force-transmission combs for connection to the skin elements,
   wherein the plurality of skin elements are fixed to the plurality of prefabricated integral units in a frictional and/or interlocking manner via the plurality of force-transmission combs,
   wherein the force-transmission combs formed on the integral units are directly connected to the skin elements, and
   wherein a plurality of glass-fiber and aluminum composite tabs are provided at a plurality of connecting points of the skin elements and the plurality of force-transmission combs, and wherein the plurality of glass-fiber and aluminum composite tabs are capable of compensating for different thermal coefficients of expansion of light metal alloys and fiber-reinforced plastics.

2. The aircraft fuselage structure according to claim 1, wherein the integral units are each prefabricated in one piece.

3. The aircraft fuselage structure according to claim 1, wherein the integral units each have a main body running in the plane of a fuselage segment and forming the frame, and connecting elements which protrude therefrom and are adapted for connection to skin elements comprising stringers and skin.

4. The aircraft fuselage structure according to claim 1, wherein the integral units run in an annularly closed manner over the entire circumference of a fuselage segment.

5. The aircraft fuselage structure according to claim 1, wherein the integral units contain a hold cross member.

6. The aircraft fuselage structure according to claim 1, wherein the integral units contain a hatrack stiffening means.

7. The aircraft fuselage structure according to claim 1, wherein the integral units contain a main deck cross member.

8. The aircraft fuselage structure according to claim 5, wherein the integral units contain supporting elements for the cross members.

9. The aircraft fuselage structure according to claim 1, wherein the integral units are produced from fiber-reinforced plastic.

10. The aircraft fuselage structure according to claim 9, wherein the integral units are produced from carbon-fiber-reinforced plastic.

11. The aircraft fuselage structure according to claim 1, wherein the aircraft fuselage structure is assembled from a plurality of prefabricated integral units and a plurality of prefabricated skin elements connected together.

12. The aircraft fuselage structure according to claim 11, wherein the connecting elements are formed by a force-transmission comb comprising teeth protruding from the main body of the integral unit to which the skin elements are fixed.

13. A method for producing an aircraft fuselage structure with frames running in the circumferential direction, stringers running in the longitudinal direction and a skin which is arranged thereon and outwardly seals the aircraft fuselage in a compression-proof manner, the method comprising the following steps:
    producing one-piece integral units each comprising at least a frame of a fuselage segment, and a plurality of force-transmission combs for connection to skin elements;
    producing the skin elements comprising at least a skin and stringers;
    arranging the integral units on an installation apparatus;
    providing a plurality of glass-fiber and aluminum composite tabs, at a plurality of connecting points of the skin elements and the plurality of force-transmission combs; and
    mounting and connecting the skin elements to the integral units in a frictional and/or interlocking manner via the plurality of force-transmission combs such that the force-transmission combs formed on the integral units are directly connected to the skin elements; and
    wherein the glass-fiber and aluminum composite tabs are capable of compensating for different thermal coefficients of expansion of light metal alloys and fiber-reinforced plastics.

14. The method according to claim 13, wherein frame angle brackets formed on the integral units are riveted to the skin elements.

15. The method according to claim 13, wherein the skin elements are completed with stringers, and window frames and door frames, prior to installation.

* * * * *